(12) United States Patent
Haheim et al.

(10) Patent No.: US 7,694,735 B2
(45) Date of Patent: *Apr. 13, 2010

(54) SONDE

(76) Inventors: Svein Haheim, Odins Gate, 0266, Olso (NO); Robert Hughes Jones, Park House, Park Lane, Fen Drayton, Cambridge, Cambridgeshire CB24 (GB) 4SW; Paul Steven Jaques, Tallanside, The Belyars, St Ives, Cornwall (GB) TR26 2DP; Will Wason, 16 Victoria Square, Penzance, Cornwall (GB) TR18 2EP; Tsutomu Yamate, 1-24-5-403, Kagahara, Tsuzuki-ku, Yokohama-shi, Kanagawa-ken (JP) 224-0055; Tatsuki Endo, 1-28-10-D1-401,Unomori, Sagamihara-shi, Kanagawa-ken (JP) 228-0801; James Edward Martin, 5 The Spinney Cottenham, Cambridge (GB) CB4 8RN; Colin Wilson, Belle Creer, Shinyurigaoka 906 3-13-1, Kami Asao, Asao-ku Kawasaki-shi, Kanagawa-ken (JP) 215-0021

( * ) Notice: Subject to any disclaimer, the term of this patent is extended or adjusted under 35 U.S.C. 154(b) by 598 days.

This patent is subject to a terminal disclaimer.

(21) Appl. No.: 11/653,488

(22) Filed: Aug. 24, 2006
(Under 37 CFR 1.47)

(65) Prior Publication Data
US 2008/0149330 A1 Jun. 26, 2008

Related U.S. Application Data

(63) Continuation-in-part of application No. 11/133,508, filed on May 20, 2005, now abandoned, which is a continuation of application No. 10/416,565, filed on May 12, 2003, now Pat. No. 6,981,550.

(51) Int. Cl.
*E21B 47/01* (2006.01)

(52) U.S. Cl. .......................... 166/250.11; 73/152.17; 181/102; 367/188; 367/911

(58) Field of Classification Search ............ 166/250.11, 166/242.6, 241.6, 272.4, 242.7; 367/188, 367/911; 73/152.17; 181/102, 401
See application file for complete search history.

(56) References Cited

U.S. PATENT DOCUMENTS

| 4,794,322 A | 12/1988 | Davies |
| 4,857,831 A | 8/1989 | Davies et al. |
| 5,092,423 A | 3/1992 | Petermann |
| 5,111,903 A | 5/1992 | Meynier |
| 5,181,565 A | 1/1993 | Czernichow |
| 5,200,581 A | 4/1993 | Boyle et al. |
| 5,318,129 A | 6/1994 | Wittrisch |

(Continued)

FOREIGN PATENT DOCUMENTS

GB 2404252 A 1/2005

(Continued)

*Primary Examiner*—Giovanna C Wright
(74) *Attorney, Agent, or Firm*—Matthias Abrell; Jaime Castano; Dale Gaudier

(57) ABSTRACT

A sonde and an apparatus for the deployment thereof against a well casing is described, the sonde comprising a resilient C-shaped member and at least one sensor.

13 Claims, 9 Drawing Sheets

U.S. PATENT DOCUMENTS

| | | |
|---|---|---|
| 5,687,806 A | 11/1997 | Sallwasser et al. |
| 5,692,565 A | 12/1997 | MacDougall et al. |
| 5,956,132 A | 9/1999 | Donzier |
| 6,070,662 A | 6/2000 | Ciglenec et al. |
| 6,173,804 B1 | 1/2001 | Meynier |
| 6,247,542 B1 | 6/2001 | Kruspe et al. |
| 6,289,985 B1 | 9/2001 | Meynier |
| 6,378,607 B1 | 4/2002 | Ryan et al. |
| 6,385,132 B1 | 5/2002 | Sackett |
| 6,766,854 B2 | 7/2004 | Ciglenec et al. |
| 6,939,717 B2 | 9/2005 | Jiang et al. |
| 6,981,550 B2 * | 1/2006 | Haheim et al. ......... 166/250.11 |
| 6,995,360 B2 | 2/2006 | Jones et al. |
| 7,124,818 B2 | 10/2006 | Berg et al. |
| 2002/0194906 A1 | 12/2002 | Goodwin et al. |
| 2005/0275557 A1 * | 12/2005 | Newberg ................. 340/686.4 |
| 2006/0008382 A1 | 1/2006 | Salamitou et al. |

FOREIGN PATENT DOCUMENTS

| | | |
|---|---|---|
| GB | 2409902 A | 7/2005 |

* cited by examiner

HYDRAULIC OR GAS SOURCE

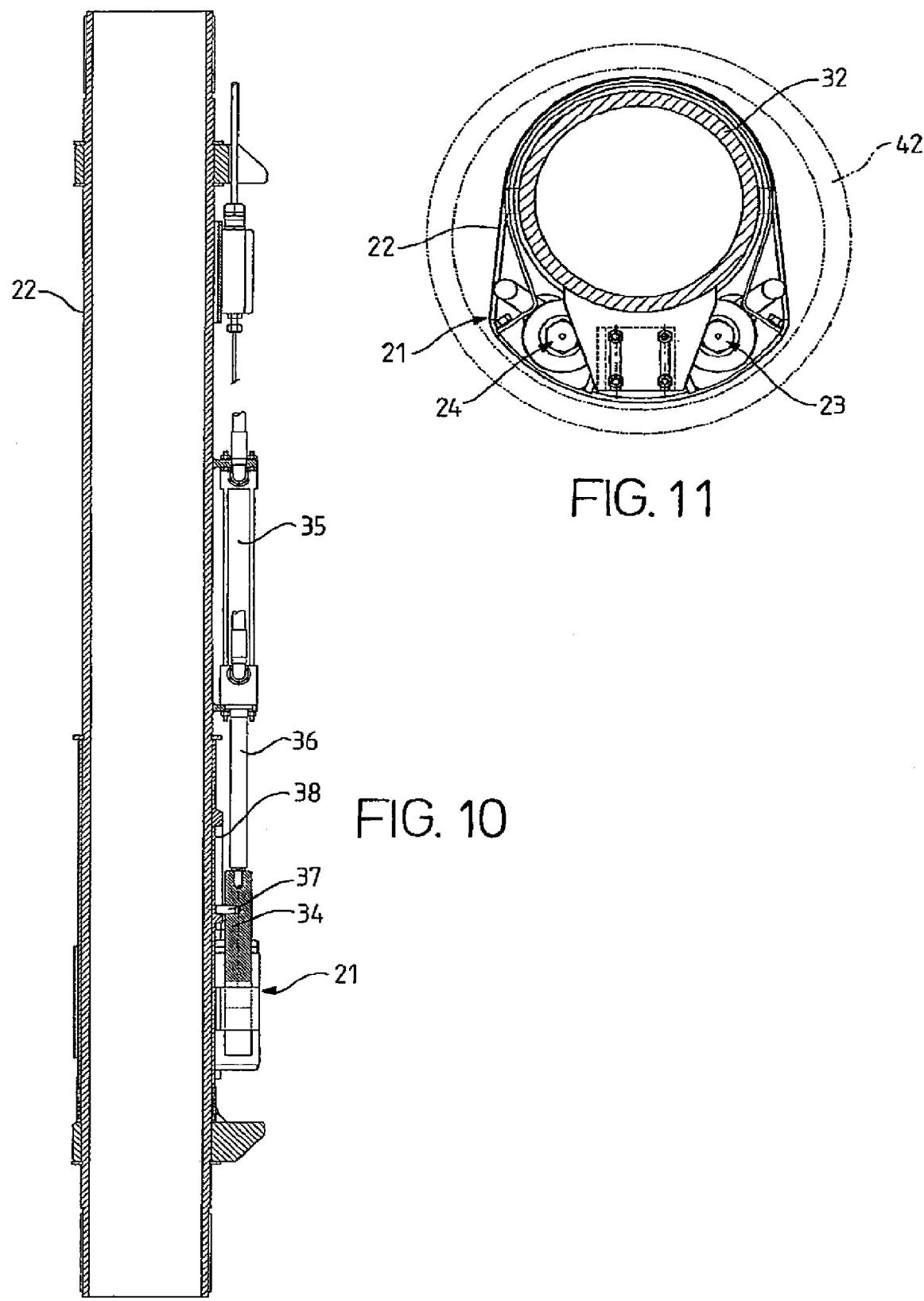

SONDE

This is a continuation-in-part of U.S. patent application Ser. No. 11/133,508, filed 20, May 2005, and entitled "Sonde," which is a continuation of U.S. patent application Ser. No. 10/416,565, filed 12, May 2003, now U.S. Pat. No. 6,981,550, which claims priority to PCT/GB02/04317, filed Sep. 24, 2002.

The present invention relates to sondes, such as seismic or microseismic sondes.

Systems for permanently installing a sonde against an inner wall of a pipe, such as the casing of a fluid extraction well, are known. Such systems are described in, for example, U.S. Pat. Nos. 5,092,423, 5,181,565, 5,200,581, 5,111,903, 6,289,985 and 6,173,804. The first four patents describe arrangements in which the sonde is moved from a retracted position in a carrier to a position pressing against the wall but in all cases the sonde remains mechanically coupled to the carrier. The latter patent describes a system that includes a flexible element carrying a sonde, which element is restrained in a compressed state to allow the assembly to be lowered into a well casing. When the assembly has been positioned in the well as required, the flexible, resilient element is allowed to expand by the release of a locking mechanism that holds the element in its compressed state. At the same time, mechanical isolation is provided of the flexible element, and thus the sonde. The method of releasing the lock is to apply an overpressure within the well casing pipe, which operates a hydraulic ram to release it. This method of instigating the installation of this mechanical clamping of the sonde to the well casing has a number of disadvantages. Pressurizing the space between the production tubing and the well casing is not a process preferred by production well installers. Other devices, such as packers, may also be installed, and modem practice is to 'inflate' such devices by means of pressurizing the production tubing itself, and thus hydraulically connecting the packer setting mechanism to the production tubing, or to provide a separate hydraulic supply to 'inflate' them. Furthermore, this method of deploying a sonde to a well casing uses a mechanism to effect the release of the compressed flexible element in a switch-like action. Thus, there is no control of the placing of the sonde to the casing after release, thus imparting excessive shock to the sonde.

According to the present invention from one aspect, there is provided a sonde comprising an expandable and/or resilient C-shaped member and at least one sensor, the member being compressible, or having been compressed, to bring its ends closer together.

Examples of the invention utilize a sonde, in the form of an expandable "C"-shaped ring clamp, which tends itself to a method wherein the sonde is inserted into a production well by compressing the sonde about a length of production tubing or other carrier, and whereby deployment and mechanical isolation of the sonde from the carrier can then easily be achieved simply by releasing the compressing mechanism. Preferred examples of the invention utilize the pressure applied to production tubing for the installation of other devices, such as packers, or utilize an existing hydraulic supply, typically one used for installation only, within a production well, to effect clamping of a sonde to the well casing.

By utilizing such convenient hydraulic sources, in combination with a suitable deployment mechanism, the sonde can be deployed under control to avoid the mechanical shock that can result from the use of some existing systems.

The present invention will now be described, by way of example, with reference to the accompanying drawings, in which:

FIG. 10 is a sectional view taken along line Z-Z of FIG. 9 in the direction shown;

FIG. 11 is a sectional view taken along line Y-Y of FIG. 9 in the direction shown;

Figure 1:
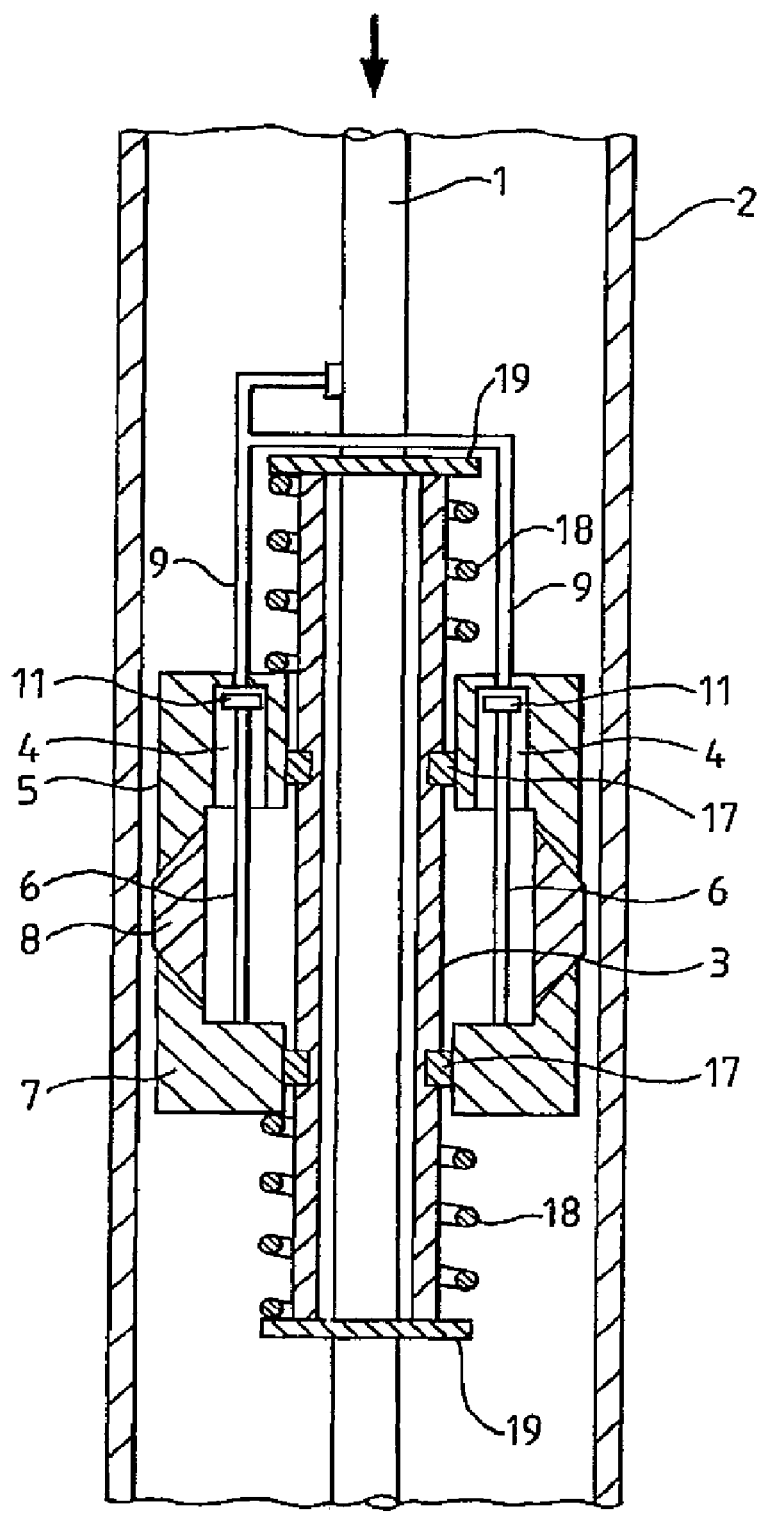
FIG. 1 illustrates, diagrammatically and not to scale, a mechanism for clamping a sonde to a well casing, in a 'loaded' state, prior to clamping.

Referring to FIG. 1, well fluid production tubing 1 lies within a well casing 2. A clamping mechanism assembly comprises a cylinder 3 with hydraulic or gas rams 4, integral with an upper taper-ended cylinder 5, with ram output shafts 6 being connected to a lower taper-ended cylinder 7, the cylinders 5 and 7 retaining an expandable, resilient 'C'-shaped clamp ring 8 about tubing 1. Each ram 4 is a bore in the cylinder 5 with a piston 1 connected to the respective output shaft 6. The cylinders 5 and 7 each retains a respective circlip 17, the circlips 17 being fitted in grooves in the cylinder 3 in a compressed state. Each of the rams 4 is fed with either hydraulic fluid or gas from a pressurized source to operate the clamping mechanism.

In the illustration shown as FIG. 1, the hydraulic fluid or gas source that is pressurized to operate the clamping mechanism is supplied via pipes 9 from the production tubing 1.

Figure 2:
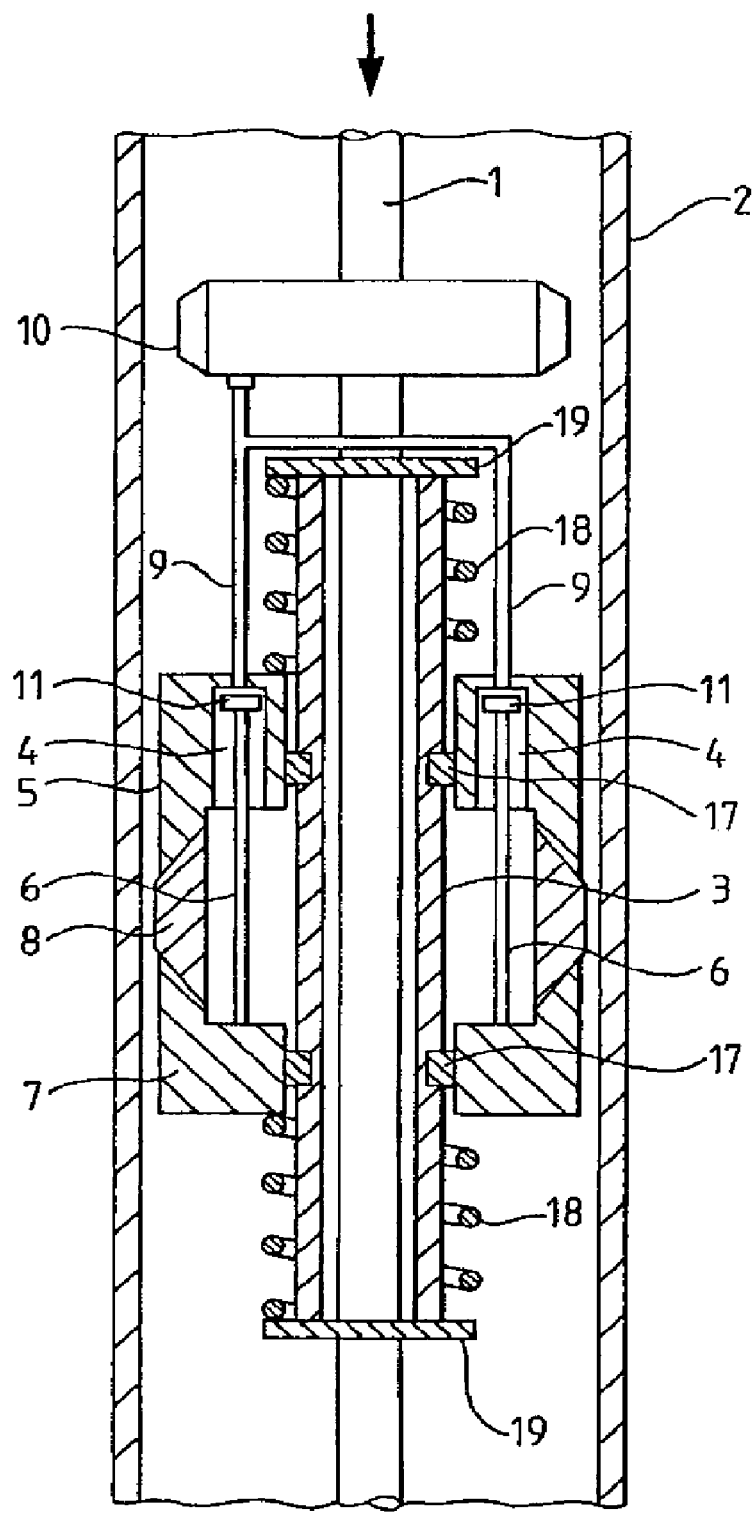
FIGS. 2, 3 and 4 illustrate alternatives to what is shown in FIG. 1.

Alternatively, as shown in FIG. 2, the hydraulic fluid or gas source may be the same one that feeds packers in the well which are pressurized at installation to pump up their circumferential expandable sections to seal them to the well casing. In FIG. 2, a packer 10 is connected hydraulically (or via gas) to the production tubing 1 running through its centre, via an orifice (not shown) in the tubing wall internal to the packer, there being a tapping from the packer 10 to the pipes 9 to feed the rams 4.

Figure 3:
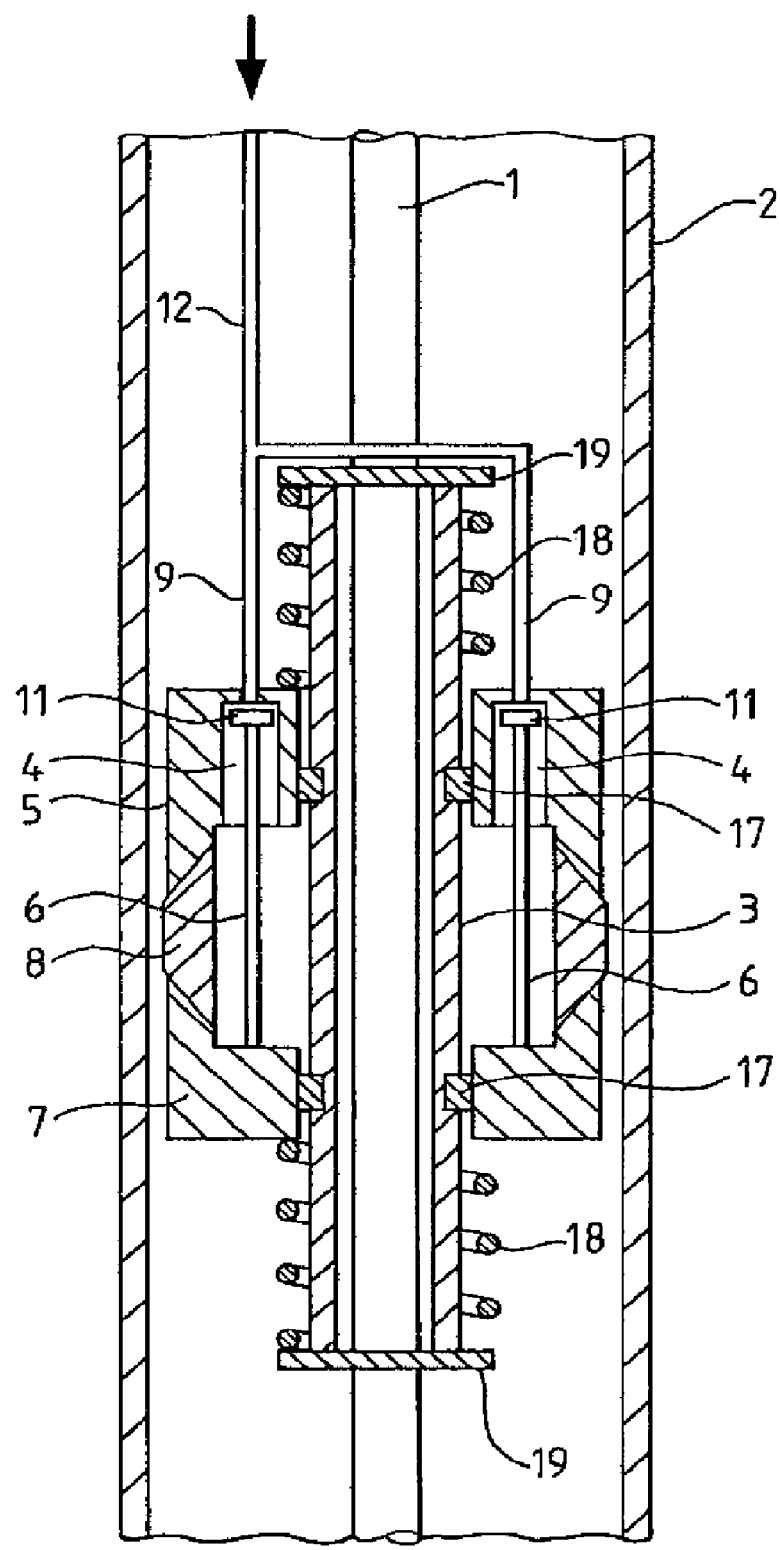

As a farther alternative, as shown in FIG. 3, the clamping mechanism may be operated by a separate hydraulic or gas feed via pipe 12, pressurized at installation.

Figure 4:
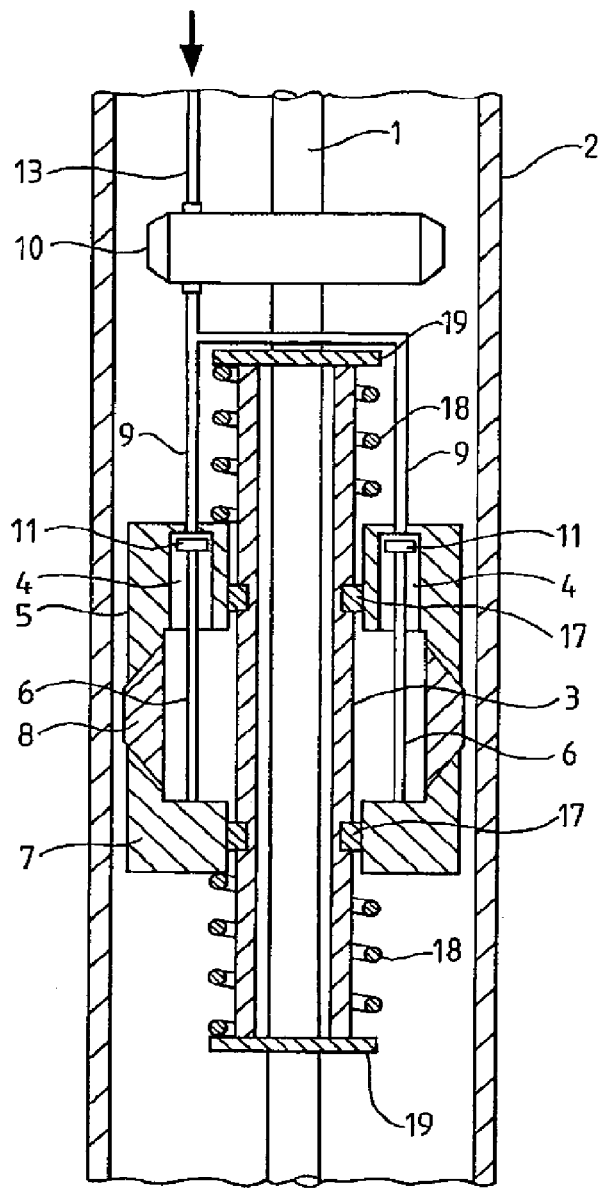

As another alternative, as shown in FIG. 4, the packer 10 may be 'inflated' by a separate hydraulic or gas feed via pipe 13 which is lapped to feed the clamping mechanism via pipes 9.

Figure 5:
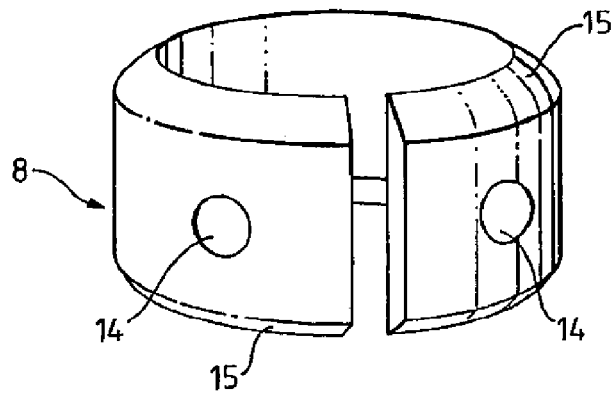
FIG. 5 illustrates a clamping ring, housing seismic sensors and forming a sonde.
Figure 6:
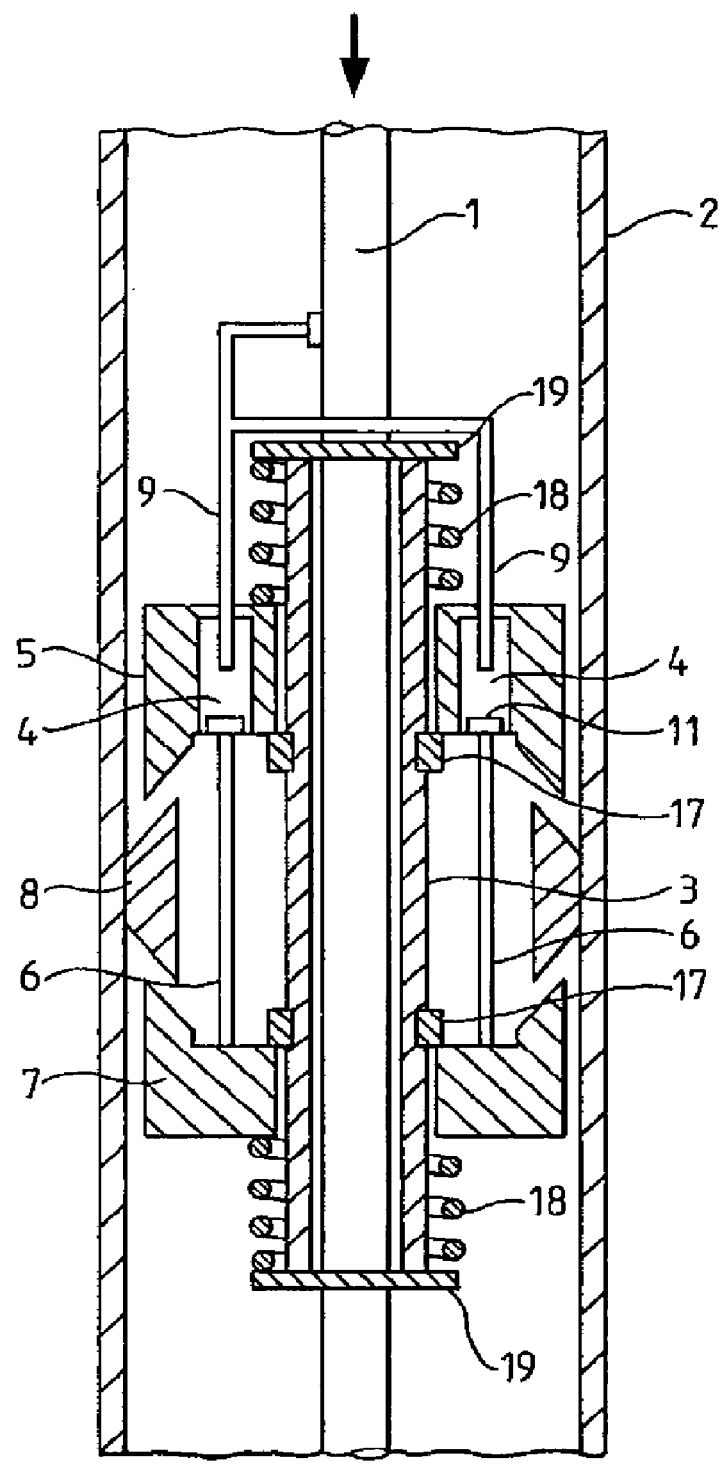
FIG. 6 shows the mechanism of FIG. 1 deployed to the casing wall.

Since the mode of operation is identical for all hydraulic or gas feed supply methods as per the above, FIGS. 1, 5 and 6 will be used to describe further details of the operation of the clamping mechanism of each of the above examples.

FIG. 5 shows 'C'-shaped ring clamp 8, i.e. the sonde, in its expanded state. The ring clamp 8 houses as many seismic (e.g. microseismic) sensors 14, as are required to form the sonde and each circumferential end of the ring is tapered as shown at 15. This ring 8 is held in a compressed state by the tapered ends of the cylinders 5 and 7 which are forced together by compression springs 18 acting between the ends of the cylinders 5 and 7 and rings 19 attached to the ends of the cylinder 3.

The process of installation of the sonde is as follows:

The clamping mechanism is 'loaded' by compressing the 'C'-shaped ring clamp 8 to bring its ends closer together, and holding it in this compressed state between the taper-ended cylinders 5 and 7. At the same time, the circlips 17 are also held in the compressed state by the cylinders 5 and 7. The 'loaded' clamping mechanism is lowered, along with other items that may also be installed at the same time, such as packers, down the well with the production tubing 1 passing through the centre, until it is in the required position as shown in FIG. 1. Hydraulic or gas pressure is then applied, whereupon the hydraulic rams 4 force the cylinders 5 and 7 apart, against the further compression of the springs 18. This releases the 'C'-shaped ring clamp 8, housing the seismic sensors and making up the sonde, which thus expands to grip tightly the inside of the well casing 2. The forcing apart of the cylinders 5 and 7 also results in the release of the circlips 17. Release of the circlips 17 prevents the cylinders 5 and 7 being forced back together if the source hydraulic or gas pressure is removed after installation. This deployed state is illustrated in FIG. 6.

A gradual increase of the source pressure will cause the rams 4 to move the cylinders 5 and 7 slowly. As the ends of the clamp ring 8 and the cylinders 5 and 7 are tapered/chamfered, the slow movement of the cylinders 5 and 7 will allow the clamp ring 8 to expand slowly until it mates with the inner surface of the well casing 2. Thus, the deployment of the sonde is gentle and under control through the control of the pressure rise of the hydraulic or gas source, thus avoiding mechanical shock. The sonde is thus secured to the well casing and is also mechanically isolated from the production tubing.

At the same time as this deployment takes place, the rest of the packers if fitted and powered by the same source, are deployed.

During the deployment of the sonde (or sondes) its or their angular position(s) around the production tubing 1 may need to be adjusted. Thus, the pipes 9 (or pipes 9 and 12) may need to include a flexible element and the clamping mechanism will need to incorporate features in its design such as landing nipples, to allow the use of orientation tools, and orientation gauges, to effect adjustment of the rotation angle prior to deployment. Such features depend on the detail of the design and are thus not shown in the figures.

The above examples provide a method of deployment of the clamping mechanism that is intended to be permanent. However, a further advantage of the 'chamfered edge' feature of the invention is that removal of the clamping mechanism after deployment is possible. This is particularly useful if the clamping mechanism is deployed accidentally or in an incorrect position during installation. Referring to FIG. 6, removal of the clamping mechanism can be effected by simply moving the tubing 1 which causes the cylinders 5 and 7 to drag the sonde along the casing. Thus, the clamping mechanism, complete with the clamp ring 8 forming the sonde can be removed, be it somewhat forcibly.

In addition to or as an alternative to using fluid pressure to set the clamping mechanism, there is the possibility of using a wireline tool to set the mechanism. This may be required if for some reason it was not possible to pressurize the tubing 1. The procedure would be to deploy the or each clamping mechanism to its correct position in the well and then run in a wireline tool through the tubing that would engage in a special lock. Pulling the wireline tool would release the lock and thus set the clamping mechanism.

Figure 7:
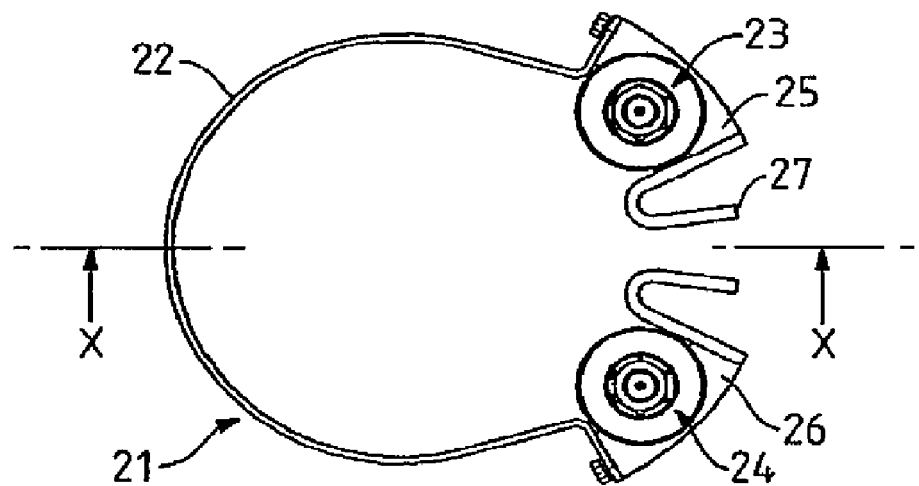
FIG. 7 is a plan view of a C-shaped sonde according to a further embodiment of the present invention.
Figure 8:
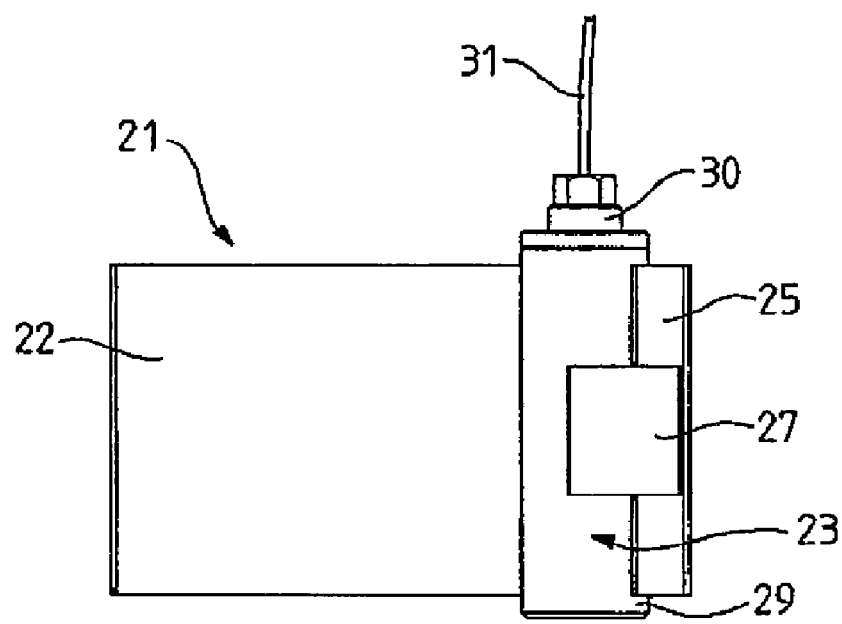
FIG. 8 is a sectional view taken along line X-X of FIG. 7 in the direction shown.

A further embodiment of a C-shaped sonde and an apparatus for its deployment will now be described with reference to FIGS. 7 to 13. This sonde 21 as shown in FIGS. 7 and 8, comprises an expandable, resilient C-shaped spring member 22 carrying a sensor vessel 23 at the end of one arm and a similarly sized dummy vessel 24 at the end of the other arm. Each of the vessels 23 and 24 is fitted into a respective vessel saddle 25, 26, through which they are attached to the ends of the C-spring member 22. Each vessel saddle is also fitted with an anchor 27, 28 positioned on the opposite side of the saddle from that attached to the C-spring member 22. The overall diameter of the sonde is such that compression of the C-spring member, by pressing the ends of the spring member towards one another, is required before the sonde can be inserted into a well casing in which it is to be deployed.

The sensor vessel 23 comprises four seismic sensors (not shown) housed in a cylindrical aluminum pod with the sensor axes aligned at 109.47 degrees to each other. The pod is in turn inserted into a cylindrical steel pressure vessel 29, the open end of which is fitted with a cap 30. Wires from the sensors are routed, along grooves machined in the outside of the pod, into the cap 30, and out through a high pressure tubing connection 31. The dummy vessel 24 contains no sensors and is attached to the C-spring member only for balance and symmetry.

Figure 9:
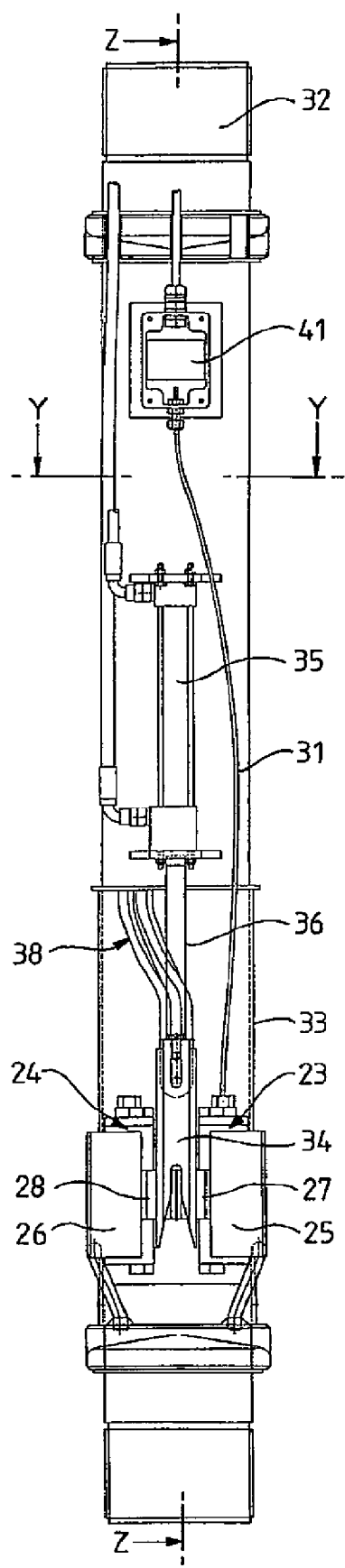
FIG. 9 is a front view of an apparatus for deploying the sonde of FIG. 7.

Referring now to FIGS. 9 and 10, the apparatus for deploying the sonde comprises a length of production well tubing 32, typically 1500 mm in length and male threaded at both ends for insertion into the production tubing of a well and, which is provided with a sonde securing and deployment mechanism This mechanism comprises a sonde supporting sleeve 33 that is rotatably mounted on the production tubing, and a sonde locking peg 34 driven by a piston 36 of a hydraulic cylinder 35 mounted on the production tubing 32 above the supporting sleeve 33. The locking peg 34 is forked at the end, with two tapered prongs, and is guidingly linked to the supporting sleeve 33 by means of a cam pin 37 on the peg 34 which pin 37 fits into a cam groove 38 machined on the outer surface of the sleeve 33.

Figure 12:
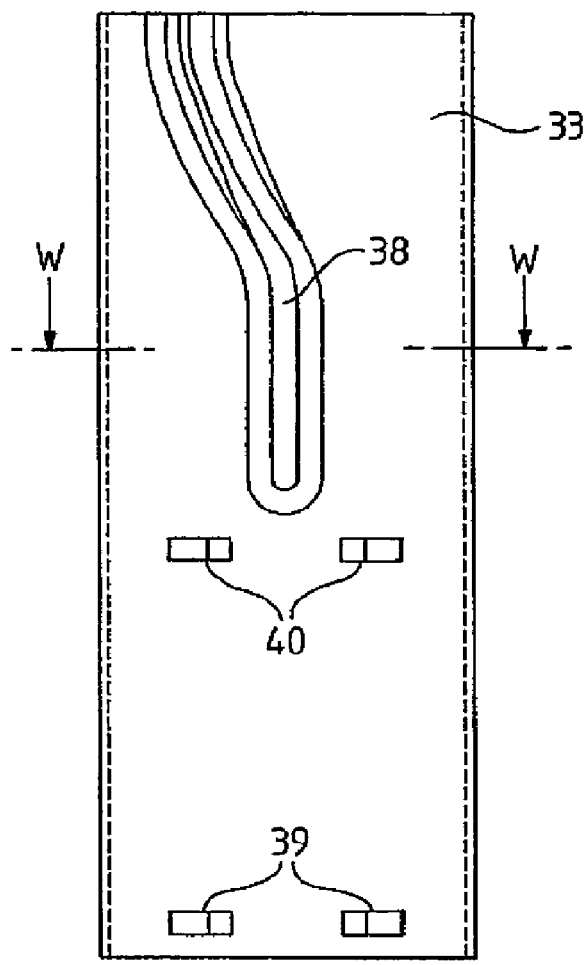
FIG. 12 is a front view of a sleeve forming part of the apparatus of FIG. 9.
Figure 13:
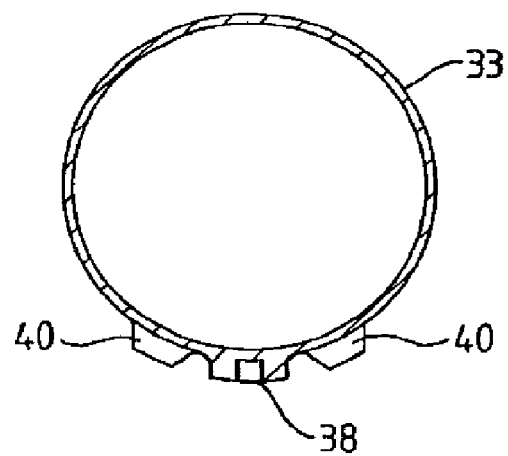
FIG. 13 is a sectional view taken along line W-W of FIG. 12 in the direction shown.

The supporting sleeve 33 is shown in greater detail in FIGS. 12 and 13, and, as can be seen in these figures, in addition to the cam groove 38 the sonde supporting sleeve 33 is provided with a pair of lower lugs 39 and upper lugs 40 for supporting the sonde. The bottom end of the cam groove is closed and is positioned between and just above the upper pair of lugs. From there, the groove extends upwards, initially vertically and then curving off to the side and up. The upper end of the groove is open.

Referring again to FIGS. 9 and 10, in order to secure the sonde 21 to the length of production tubing 32 the sonde is positioned around the supporting sleeve 33 with the piston 36 fully extended such that the forked end of the locking peg 34 clamps the sonde anchors 27, 28 together, thereby compressing the C-spring member 22 around the supporting sleeve. In this position, the cam pin 37 of the locking peg 34 is at the bottom end of the cam groove 38 in the supporting sleeve, with the effect that the upper and lower pairs of lugs 39, 40 on the sleeve are positioned respectively above and below the sensor and dummy vessels 25 and 26. The sonde is thus firmly held against both lateral and rotational movement relative to the length of production tubing 32.

Having secured the sonde 21 to and about the length of production tubing 32, the sonde and tubing assembly can then be inserted into a well casing 42, with the overall diameter of the compressed C-spring sonde being less than that of the well casing as shown in FIG. 11. Once inserted into the well casing, signals from the sonde sensors are relayed to the surface via a junction box 41 mounted on the production tubing and to which the leads within the high pressure tubing 31 from the sensor vessel 23 are connected.

Having positioned the sonde 21 and production tubing 32 assembly inside the well casing, deployment of the sonde 21 is effected by pressurizing the hydraulic cylinder 35 such that the piston 36 and locking peg 34 are retracted. As the locking peg 34 retracts, the tapering of the peg prongs ensures that the clamping effect of the peg on the sonde anchors 27, 28 is gradually released. Thus, by controlling the speed at which the piston is retracted, the rate of expansion of the C-spring member 22 can be controlled, in order to prevent the sonde striking the well casing 42 with excessive force.

By the time the cam pin 37 on the locking peg 34 reaches the beginning of the sidewardly curved section in the cam groove 38 the locking peg has fully released the sonde anchors 37, 38, such that the now expanded C-spring member 22 firmly clamps the sonde 21 in place against the inner wall of the well casing 42. As the peg 34 continues to retract, the movement of the cam pin 37 along the curved section of the cam groove 38 causes the supporting sleeve 33 to rotate about the production tubing 32, which in turn brings the upper and lower pairs of lugs 39, 40 out of contact with the sensor and dummy vessels 23, 24. Complete mechanical isolation of the sonde from the production tubing is thereby achieved.

As discussed above, the present invention contemplates utilizing a sonde, in the form of an expandable C-shaped ring clamp having a slim profile shape, with the sonde being inserted into a production well or intervention well by compressing the sonde about a length of production tubing, and when deployed by releasing the compressing mechanism the sonde package occupies a space in the production well provided by an eccentric production tubing. As shown in FIG. 11, eccentric production tubing 32, held in place by centralizers (not shown) above and below the tool setting position, provides a suitable space in the annulus between the production tubing 32 and the well casing 42 for the slim profile C-shaped ring clamp 22 to fit therein. In this, as evident from the shape of the clamp (note FIGS. 7 and 11) the "C" shape minimizes the volume of the annulus that is occupied by the sensor package thereby facilitating deployment of the sonde in restricted space of a production well. In this, modifications to the "C" shape disclosed in the figures are contemplated by the present invention so long as the shape of the clamp is suitable for the deployment needs described herein Once in place in a well casing, an installed sonde can be used to support seismic or microseismic sensors, as discussed above. In this, the C-shaped sonde provides for fully retrievable sonde systems that may temporarily be deployed in a well and later retrieved to the surface. Retrieval is accomplished by reducing the pressure of the clamp on the well casing with, for example, a drive mechanism, such as a hydraulic, electric, compressed air driven mechanism, that suitably compresses the clamp so that the sonde can be retrieved without damage to the well casing. For example, the deployment system as shown in FIGS. 9 and 10 may be configured such that the forked end of the locking peg 34 may be reinserted on the sonde anchors 27, 28 thereby compressing the member 22 for retrieval from the well. A further embodiment of a mechanism for retrieving the sonde includes an appropriately shaped device on the production tubing that engages a corresponding chamfer located below the member 22 such that retrieval of the production tubing compresses the member 22 so that the sonde can be retrieved without damage to the well casing.

The present invention contemplates temporary or permanent deployment of sondes using coiled tubing. For example, C-shaped sonde may be deployed by coiled tubing for purposes of single well hydraulic fracture monitoring, i.e., using a sonde having the C-shaped ring clamp to monitor microseismic events while fracturing the formations surrounding a single well.

In addition, sensors for other applications may be installed in the sonde, where a permanent installation is advantageous. For example, the sonde of the present invention can be used for permanent downhole well casing corrosion monitoring, by utilizing methods disclosed in U.S. Pat. No. 4,857,831 and U.S. Pat. No. 4,794,322 Roth incorporated herein by reference), and for through casing resistivity evaluation using Schlumberger's CHFR™ Cased Hole Formation Resistivity Tool.

A particularly convenient use for the installed sonde is for providing a permanent downhole installation for analysis of well casing fluid in the annulus between the production tubing and the well casing. Examples of the kinds of analysis which may be carried out are: measuring pH, measuring concentration of ions, e.g. scaling ions, as disclosed in GB 2404252 (incorporated herein by reference), analyzing hydrogen sulphide in formation fluid, as disclosed in U.S. Pat. No. 6,939,717 (incorporated herein by reference), monitoring gas by using mid-infrared LEDs, as disclosed in U.S. Pat. No. 6,995,360 (incorporated herein by reference), and discriminating between the phases of a three-phase fluid, e.g. oil, water and gas, as disclosed in U.S. Pat. No. 5,956,132 (incorporated herein by reference).

The sonde also makes a convenient platform for many types of downhole fluid measurement devices such as an electrochemical sensor to detect, e.g. hydrogen sulphide or carbon dioxide, as disclosed in GB 2409902 (incorporated herein by reference), a microfluidic system, e.g. for detecting hydrogen sulphide or scaling ions, as disclosed in US 2006/0008382 (incorporated herein by reference), a micro-electro mechanical system for measuring fluid properties such as density and viscosity, as disclosed in US 2002/194906 (incorporated herein by reference), The sonde may also be used as a tool to place a sensor or antenna into the wall of a well casing, the sonde carrying e.g. a sensor plug for deployment into the sidewall of the wellbore, e.g. in the manner as disclosed in U.S. Pat. No. 6,766,854 (incorporated herein by reference) or in U.S. Pat. No. 6,070,662 (incorporated herein by reference). Drilling into the wall of the well casing may be carried out by use of a flexible drilling shaft, as disclosed in U.S. Pat. No. 5,687,806 and U.S. Pat. No. 5,692,565 (both incorporated herein by reference).

The sonde may also be used to place electromagnetic sensors for active electromagnetic, magneto-telluric and seismoelectric surveying. Sonic and acoustic sensors may also be deployed in wells using the sonde for purposes of sonic and acoustic surveying.

What is claimed is:

1. A sonde comprising a resilient C-shaped member and at least one sensor mounted thereto for deployment into a well, the member having an annular configuration with a single gap that defines two ends facing each other, the member being compressible, or having been compressed, to bring its ends closer together, wherein the sonde is for installation in or installed in a pipe and wherein the C-shaped member is clampable or clamped against the inner wall of the pipe.

2. A sonde according to claim 1, wherein the C-shaped member is expandable and resilient.

3. A sonde according to claim 1, which has a diameter such that compression of the C-shaped member, by pressing the ends towards one another, is required before the sonde can be inserted into the pipe in which it is to be deployed.

4. A sonde according to claim 1, wherein the pipe is a well casing.

5. A sonde according to claim 1, wherein the C-shaped member has a chamfer at a circumference.

6. A sonde according to claim 1, wherein the C-shaped member comprises one or more anchor portions, adapted to be engageable by a tool to compress the sonde.

7. A sonde according to claim 1, wherein the or each sensor has a sensor function selected from the list consisting of monitoring gas composition, pressure measurement, temperature measurement, conductivity measurement, formation resistivity measurement, hydrogen sulphide detection, pH measurement, scaling ions detection, discriminating between the phases of a three-phase fluid, well-casing corrosion monitoring, through casing resistivity evaluation, electromagnetic measurement, magneto-telluric surveying, seismo-electric surveying, acoustic measurement, sonic measurement.

8. A sonde according to claim 1, wherein the sensor or each sensor comprises a device selected from the list consisting of an electrochemical sensor, an electromagnetic sensor, a microfluidic system, a micro-electro mechanical system.

9. A sonde comprising an expandable and/or resilient C-shaped member and at least one sensor mounted thereto for deployment into a well, the member having an annular configuration with a single gap that defines two ends facing each other, the member being compressible, or having been compressed, to bring its ends closer together, wherein a sensor is located at one of the ends.

10. A sonde according to claim 9, wherein a sensor or dummy sensor is located at the other end.

11. An apparatus for deploying a sensor against a well casing, said apparatus comprising:
   a sonde, adapted to be lowered into a well, the sonde comprising a split annular member and at least one sensor mounted thereto for deployment into the well, the annular member being resilient and radially movable between a contracted and an expanded position; and
   a tool for releasably retaining the annular member in the contracted position so as to allow positioning of the sonde inside the well and subsequent deployment.

12. A method for deploying a sensor against a well casing, said method comprising:
   lowering a sonde into a well, the sonde comprising a split annular member and at least one sensor mounted thereto for deployment into the well, the annular member being resilient and radially movable between a contracted and an expanded position; and
   releasably retaining the annular member in the contracted position so as to allow positioning of the sonde inside the well and subsequent deployment.

13. A method according to claim 12, further comprising evaluating the formation traversed by the well using the at least one sensor mounted to the split annular member.

* * * * *